(12) United States Patent
Tada et al.

(10) Patent No.: US 8,230,988 B2
(45) Date of Patent: Jul. 31, 2012

(54) APPARATUS FOR TRANSFERRING VEHICLES ONTO CONVEYOR

(75) Inventors: Shoji Tada, Hino-cho (JP); Yoshifumi Yasuda, Hino-cho (JP); Junichi Miura, Tokyo (JP); Yasuhiro Takeda, Tokyo (JP)

(73) Assignees: Daifuku Co., Ltd., Osaka (JP); Honda Motor Co., Ltd., Tokyo (JP)

( * ) Notice: Subject to any disclaimer, the term of this patent is extended or adjusted under 35 U.S.C. 154(b) by 80 days.

(21) Appl. No.: 12/922,030

(22) PCT Filed: Mar. 2, 2009

(86) PCT No.: PCT/JP2009/000939
§ 371 (c)(1),
(2), (4) Date: Dec. 27, 2010

(87) PCT Pub. No.: WO2009/113268
PCT Pub. Date: Sep. 17, 2009

(65) Prior Publication Data
US 2011/0132692 A1    Jun. 9, 2011

(30) Foreign Application Priority Data
Mar. 13, 2008  (JP) .................................. 2008-063545

(51) Int. Cl.
*B65G 37/00* (2006.01)
(52) U.S. Cl. ........................ 198/346.2; 414/245; 414/258
(58) Field of Classification Search ............... 198/343.2, 198/345.1, 345.3, 346.2, 346.3; 414/227, 414/235, 241, 245, 255, 256, 258
See application file for complete search history.

(56) References Cited

U.S. PATENT DOCUMENTS

| | | | | |
|---|---|---|---|---|
| 1,816,053 A * | 7/1931 | Mcgavin | ........................ | 414/240 |
| 3,680,718 A * | 8/1972 | Miyachi | ........................ | 414/239 |
| 4,039,089 A * | 8/1977 | Kochanneck | ................. | 414/256 |
| 4,950,117 A * | 8/1990 | Go | ................. | 414/254 |
| 5,173,027 A * | 12/1992 | Trevisani | ...................... | 414/257 |
| 5,286,156 A * | 2/1994 | Ikenouchi et al. | ............. | 414/256 |
| 5,863,171 A * | 1/1999 | Engman | ........................ | 414/256 |
| 6,109,853 A * | 8/2000 | Paulmichl | ........................ | 414/239 |
| 7,458,455 B2 * | 12/2008 | Nakamura et al. | ......... | 198/463.3 |
| 7,461,733 B2 * | 12/2008 | Dohi | ........................ | 198/346.3 |
| 7,736,113 B2 * | 6/2010 | Yook et al. | .................... | 414/256 |

* cited by examiner

*Primary Examiner* — James R Bidwell
(74) *Attorney, Agent, or Firm* — Vista IP Lawgroup LLP

(57) ABSTRACT

An apparatus for transferring vehicles onto a conveyer comprises: a front wheel supporting device (6) on an elevator (5), which is provided with a pair of front and rear wheel supporting arms (29a, 29b) that freely open and close in a horizontal direction between a closed posture supporting front wheels (Wf) at a predetermined position in terms of the convey direction and an opened posture releasing the front wheels (Wf) to the convey direction; a rear wheel supporting device (7) on the elevator (5), which is provided with a wheel supporting plate (38) that supports rear wheels (Wr) without determining the position thereof in terms of the convey direction and can switch its posture between a horizontal posture and a front-down tilted posture in terms of the convey direction; and a posture switching device (40) that changes the wheel supporting plate (38) of the rear wheel supporting device (7) to the tilted posture, at least when the elevator (5), supporting a vehicle (C) with the wheel supporting arms (29a, 29b) of the front wheel supporting device (6) in the closed posture and the wheel supporting plate (38) of the rear wheel supporting device (7) in the horizontal posture, is at the lowermost position for transferring the vehicle (C) onto a conveyor (1).

6 Claims, 13 Drawing Sheets

[Fig. 1]
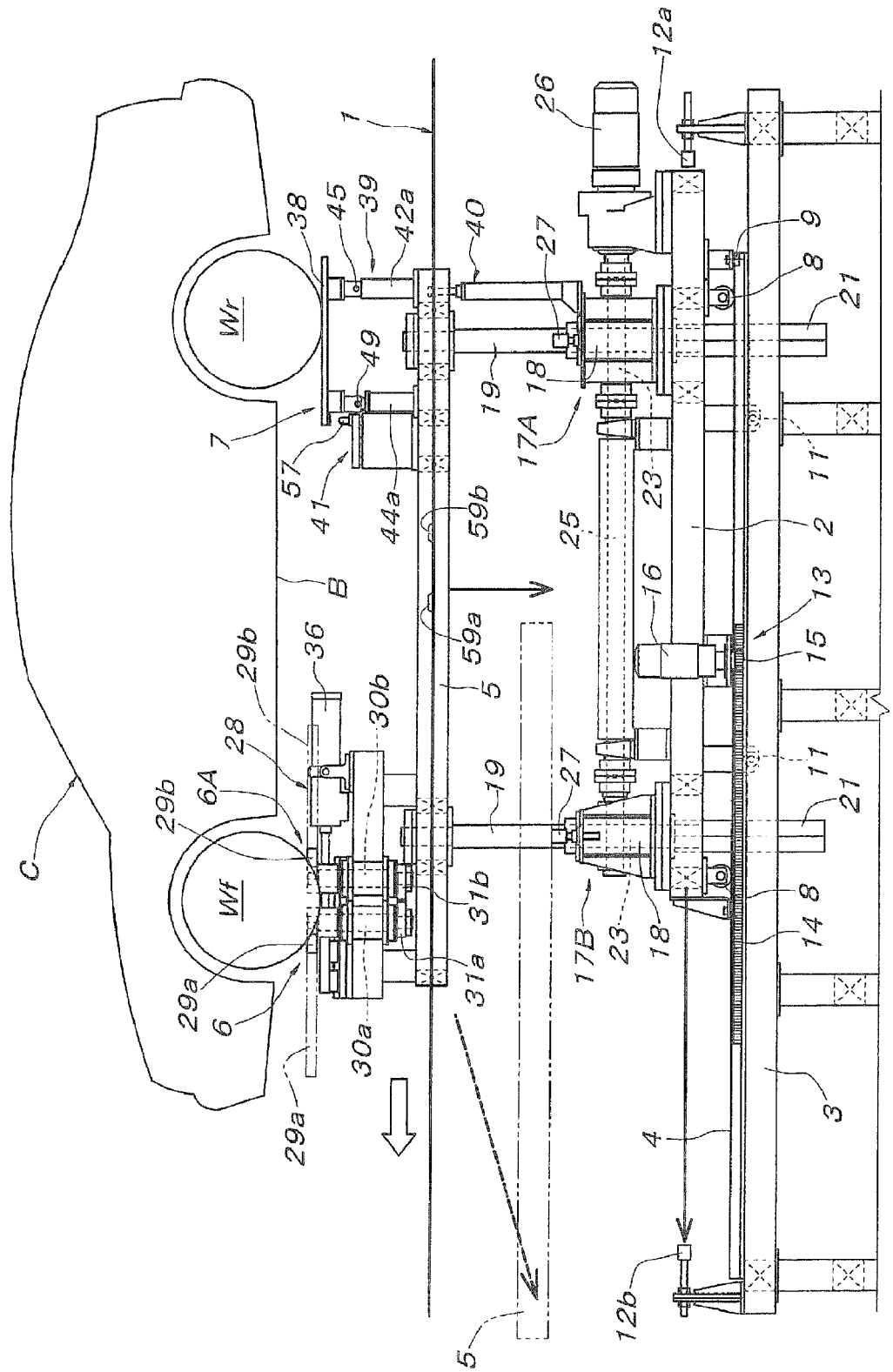

[Fig. 2]
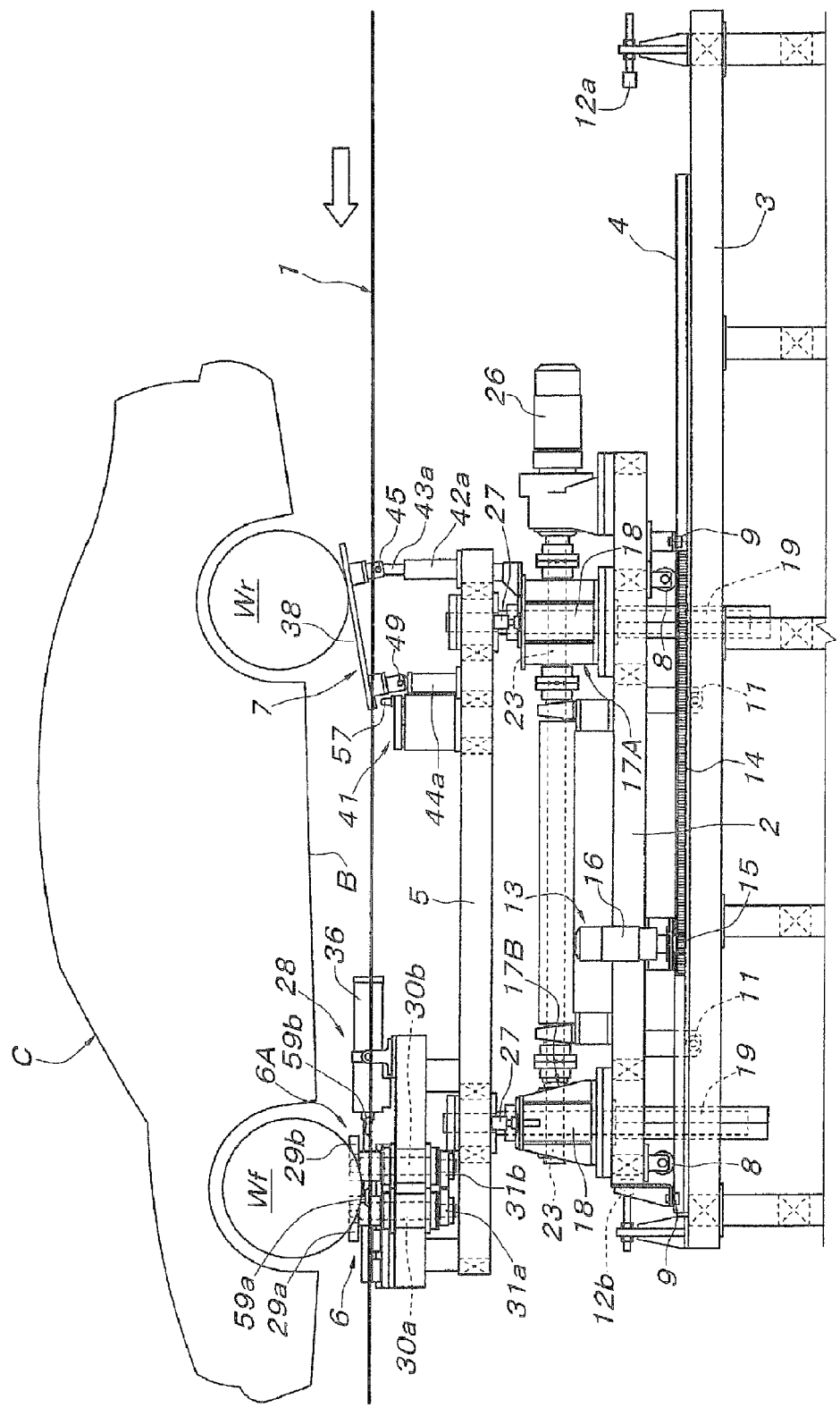

[Fig. 3]
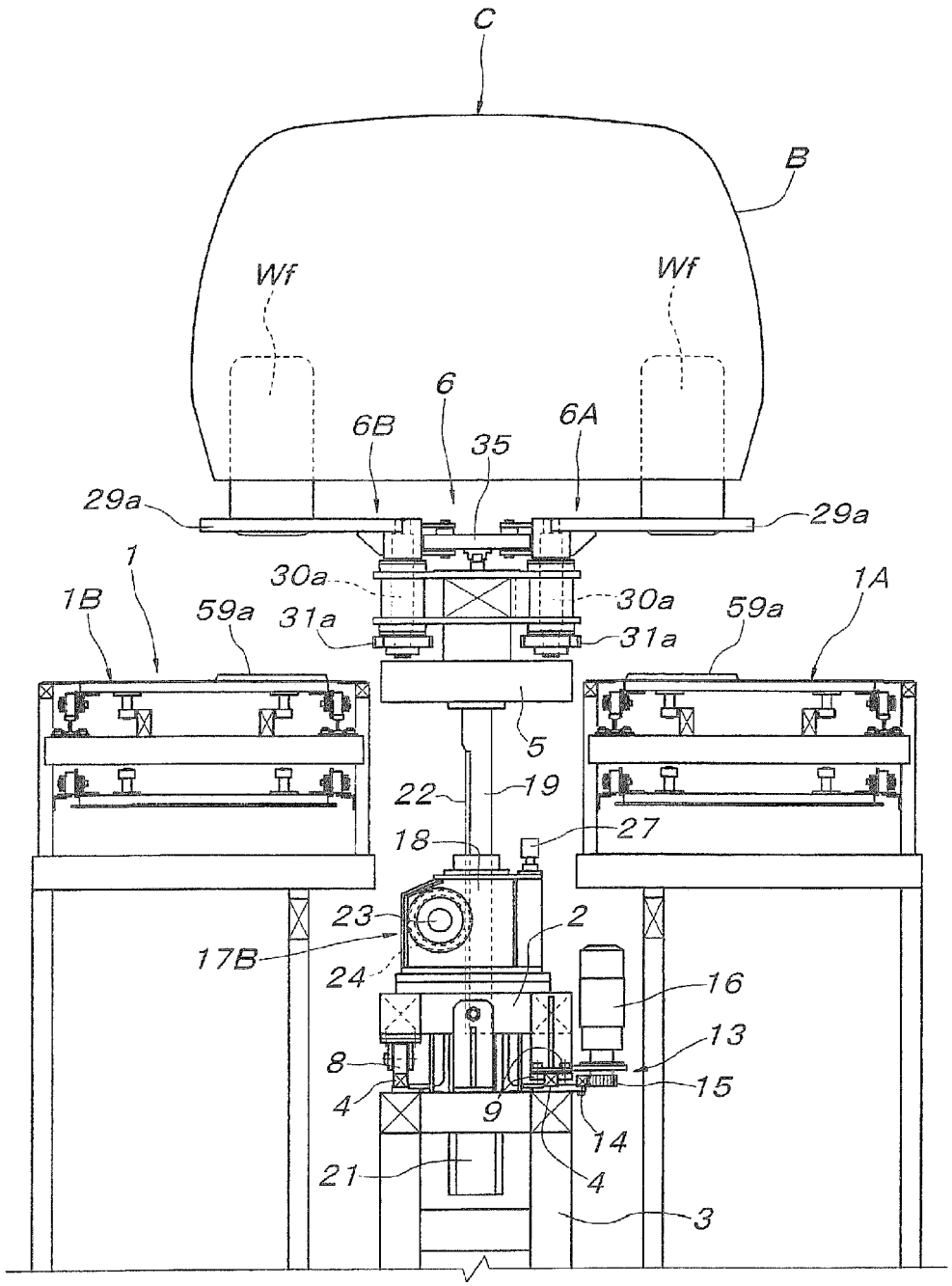

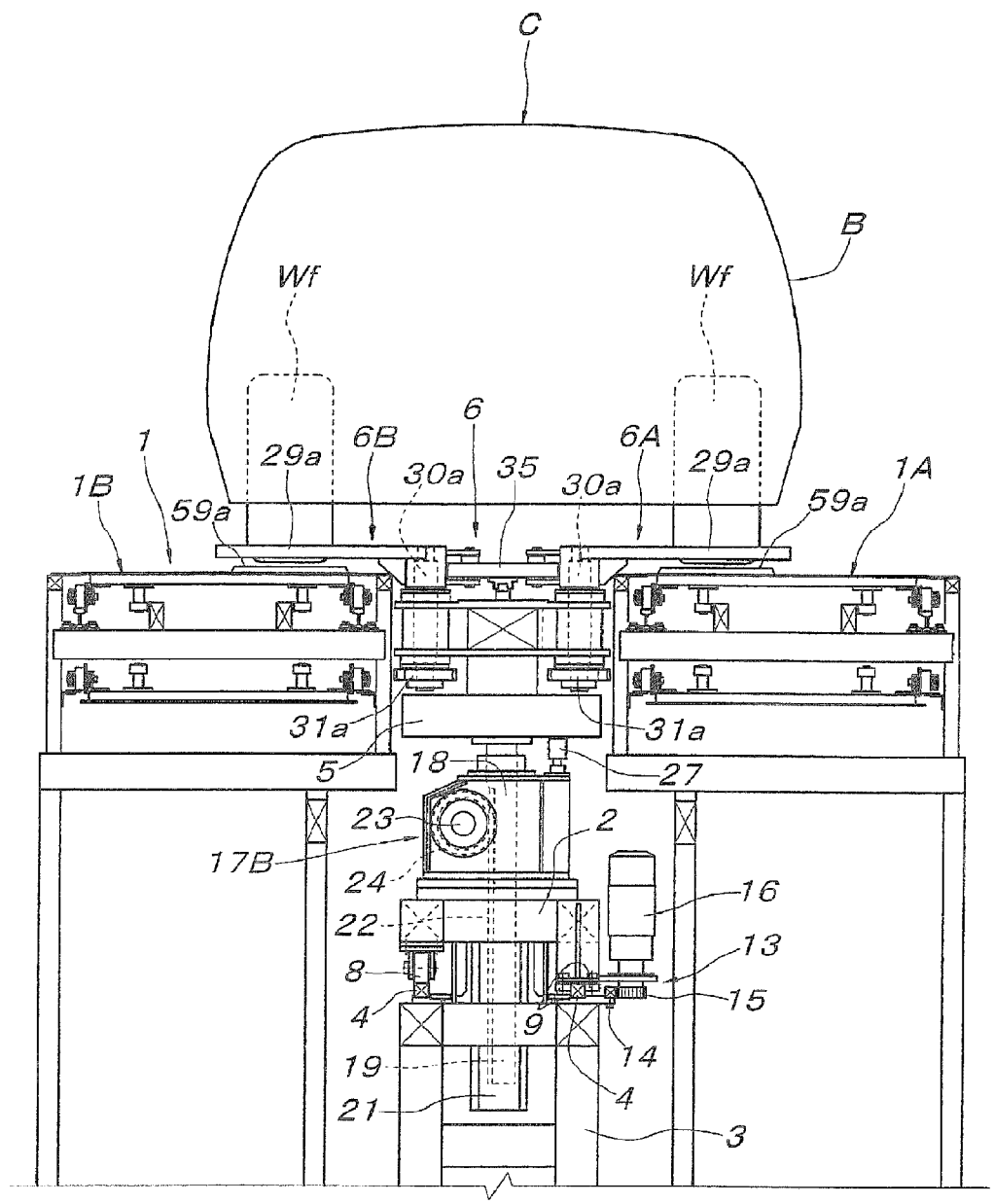
[Fig. 4]

[Fig. 5]
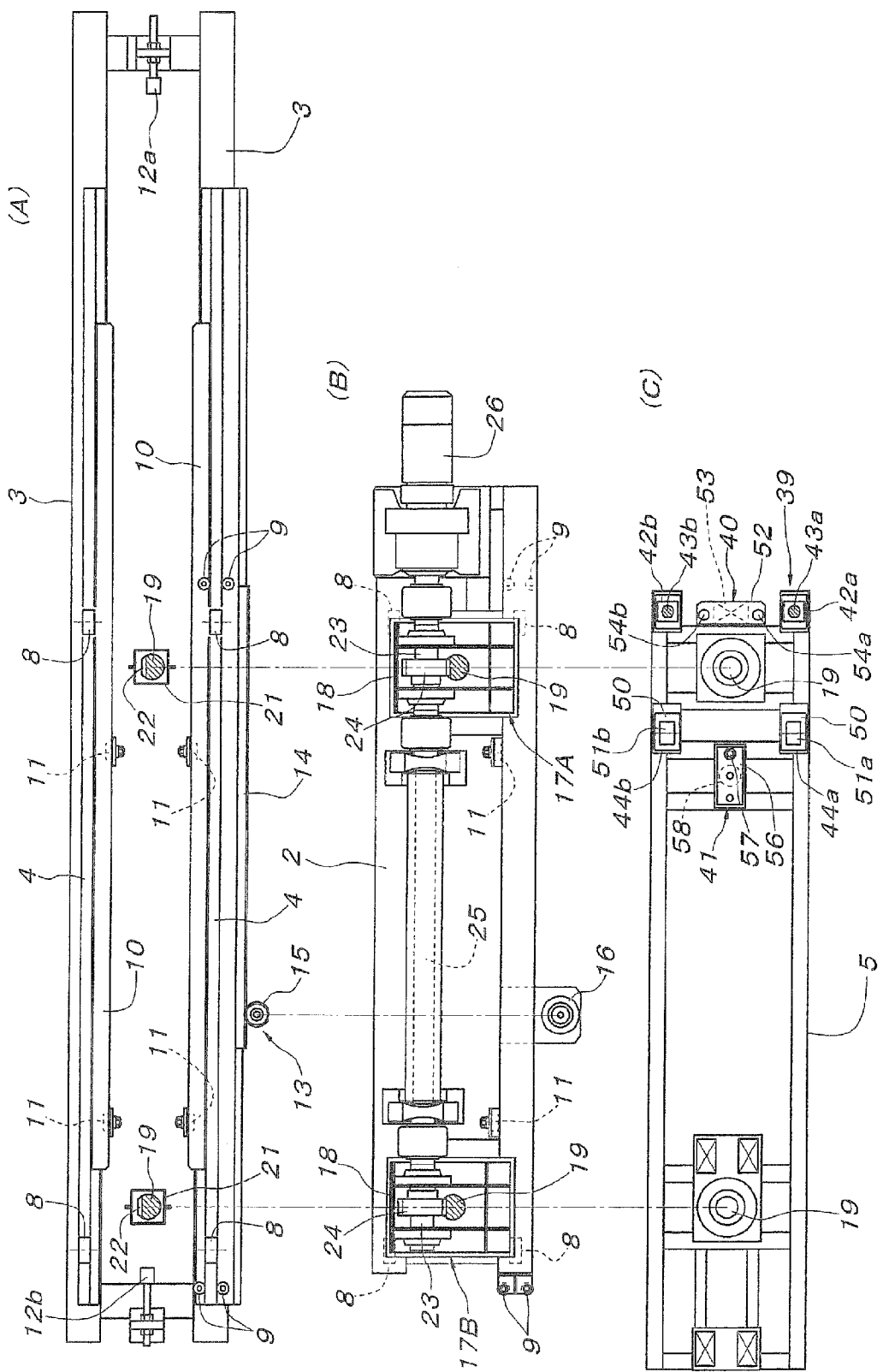

[Fig. 6]
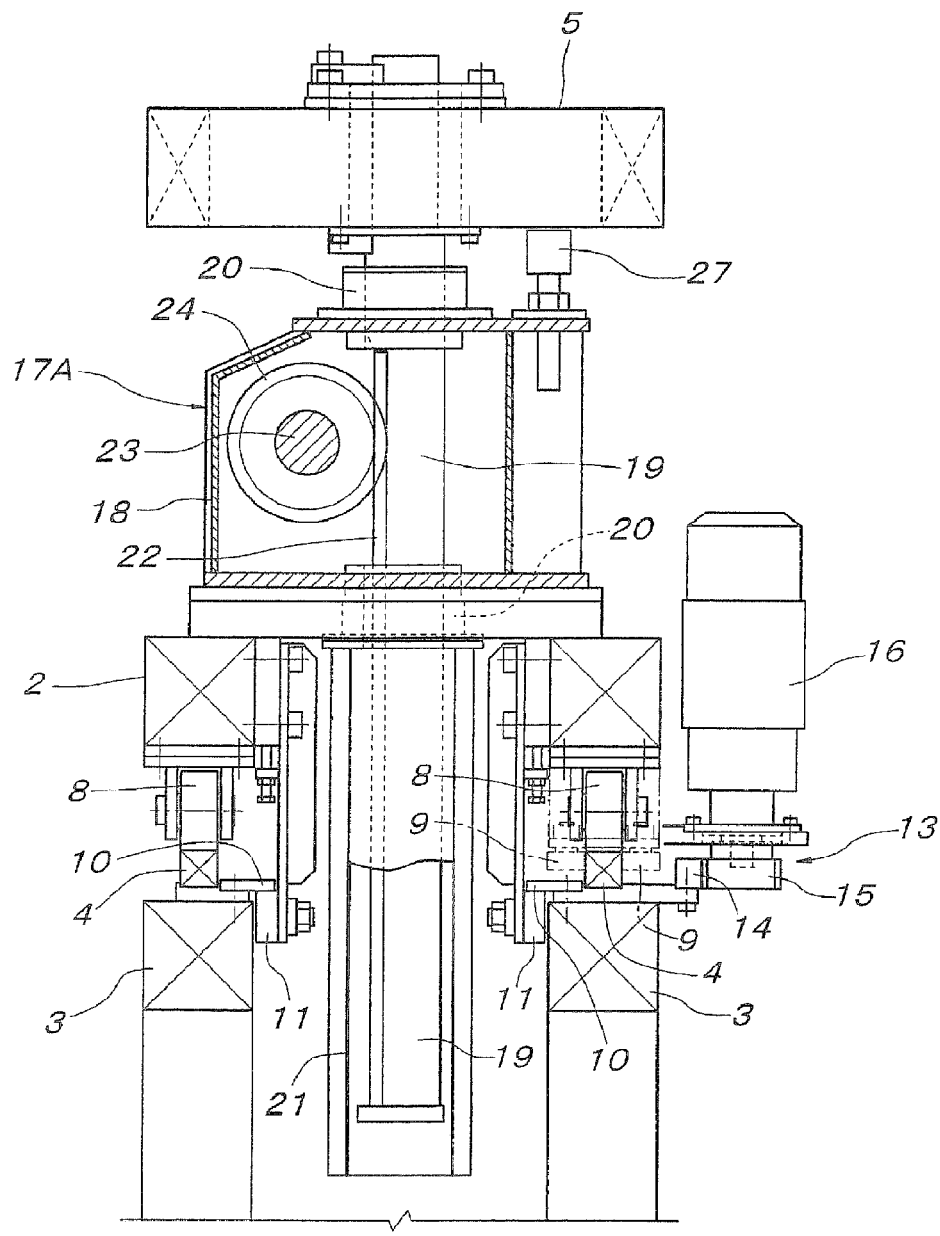

[Fig. 7]
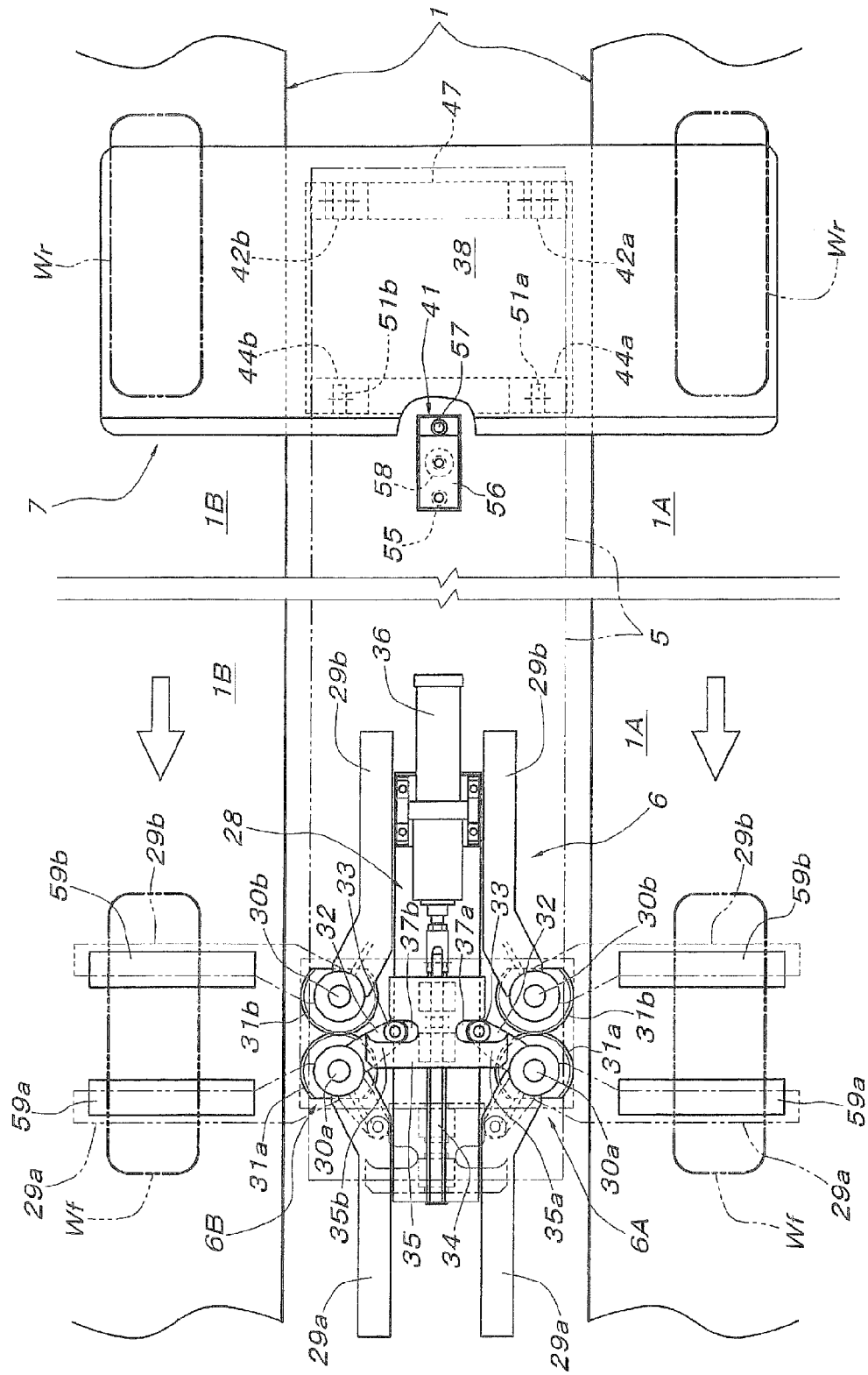

[Fig. 8]
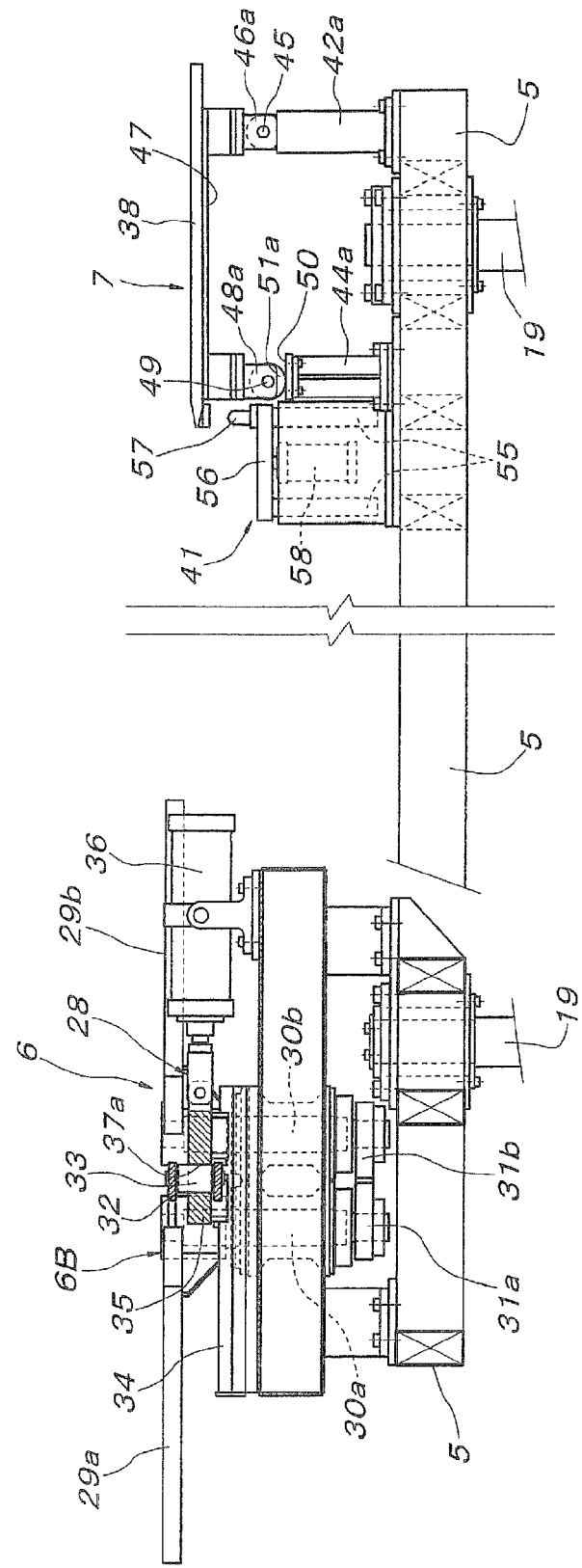

[Fig. 9]
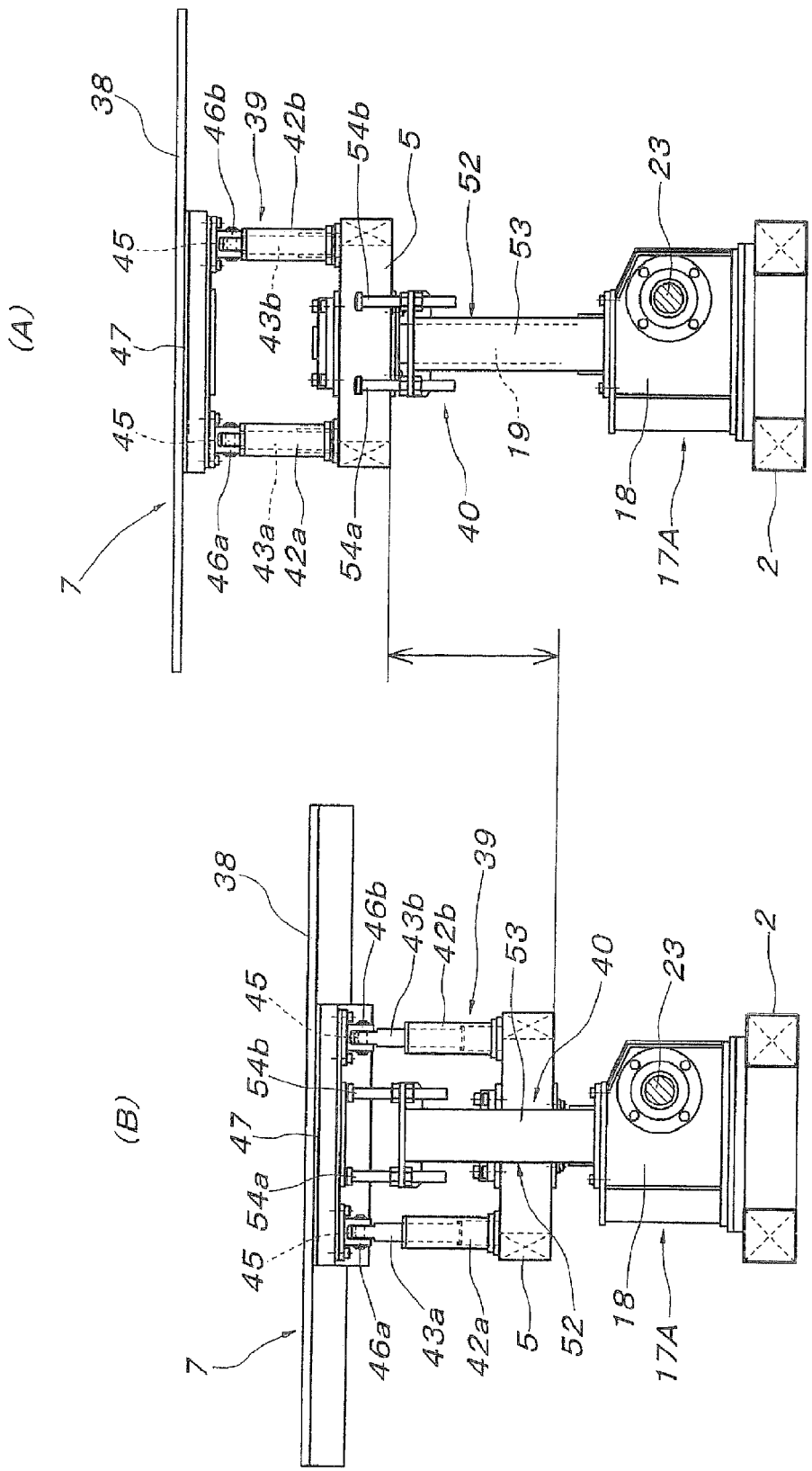

[Fig. 10]
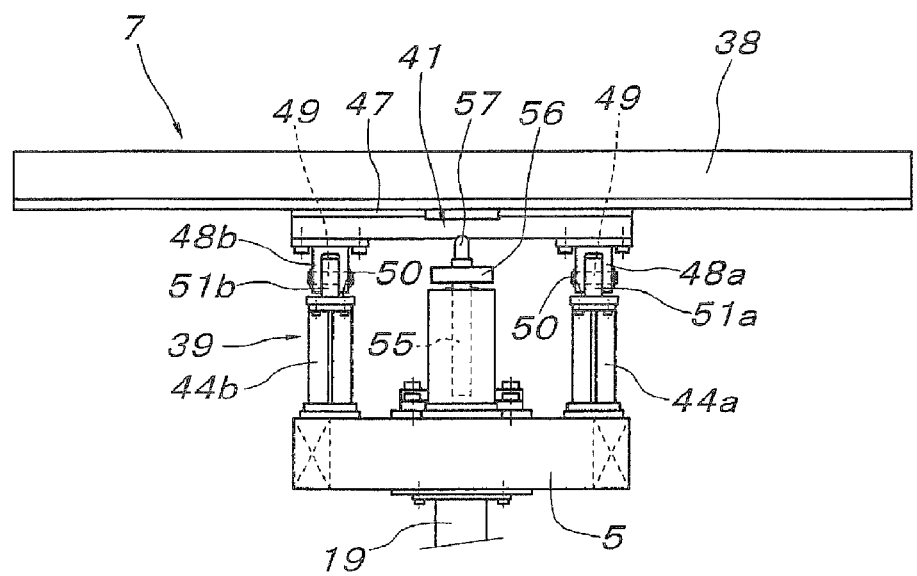
[Fig. 11]
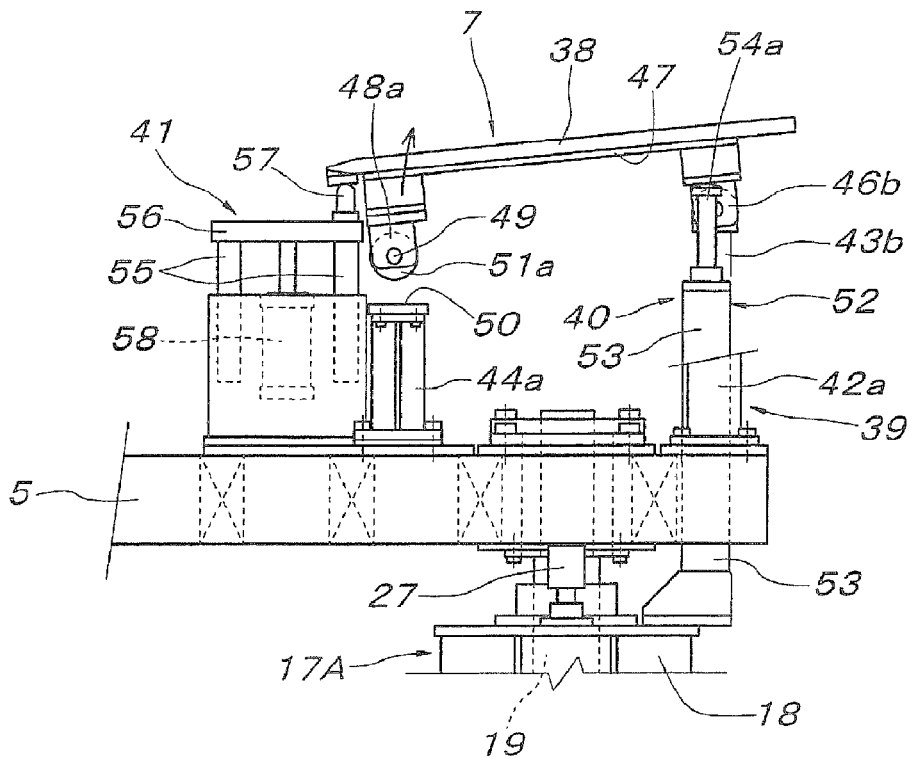

[Fig. 12]
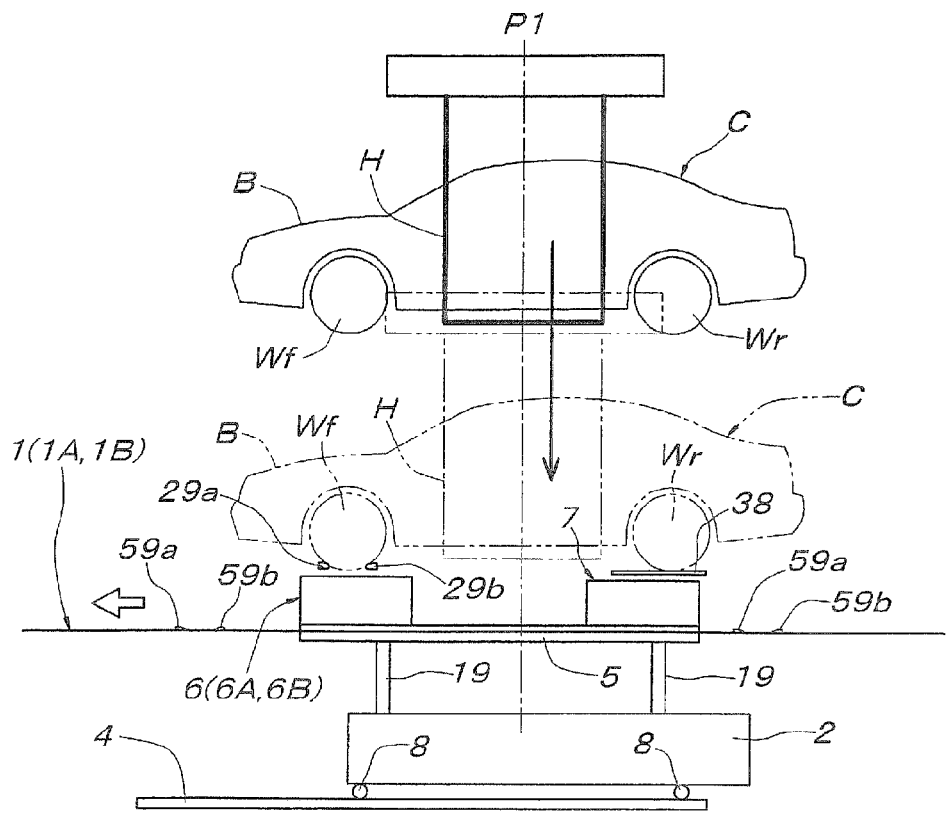
[Fig. 13]
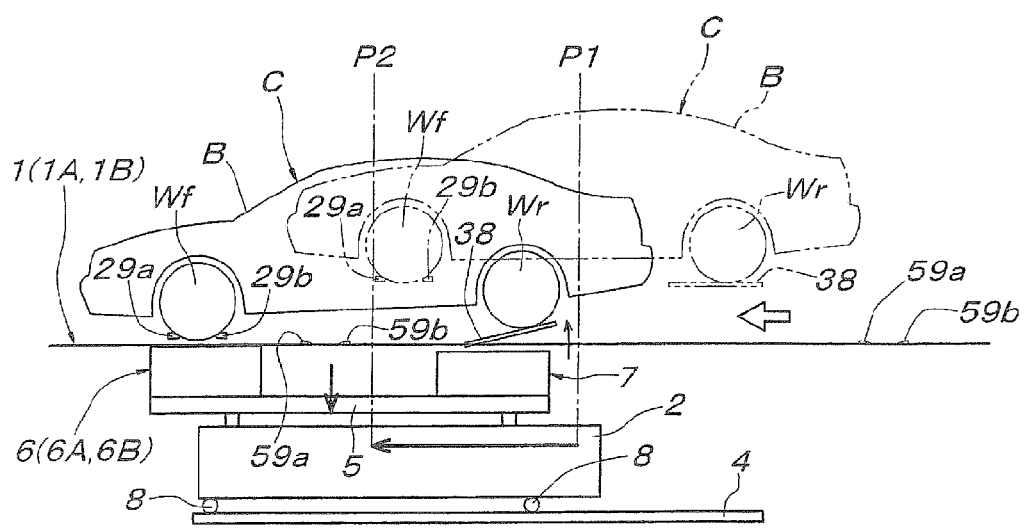

[Fig. 14]
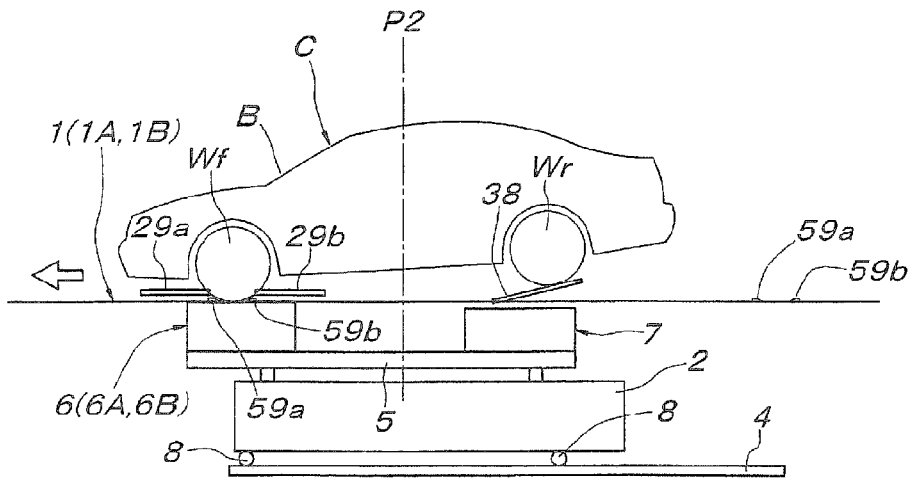
[Fig. 15]
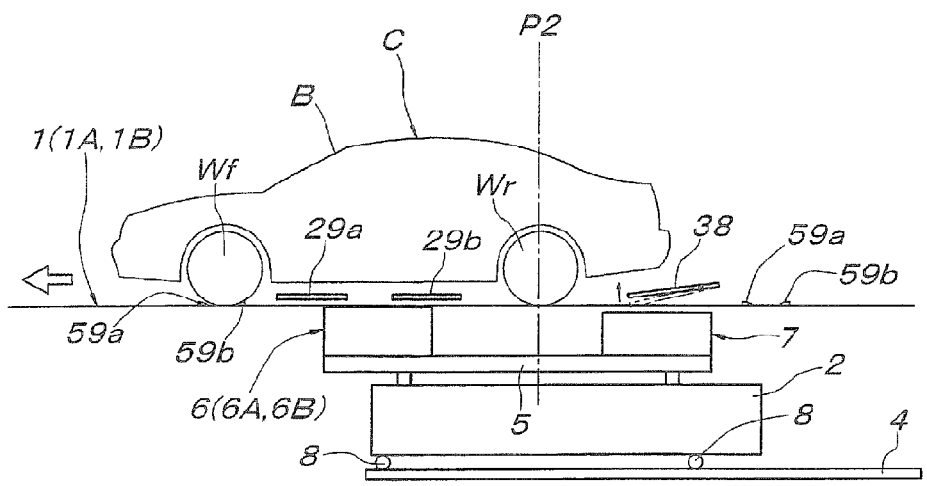

[Fig. 16]
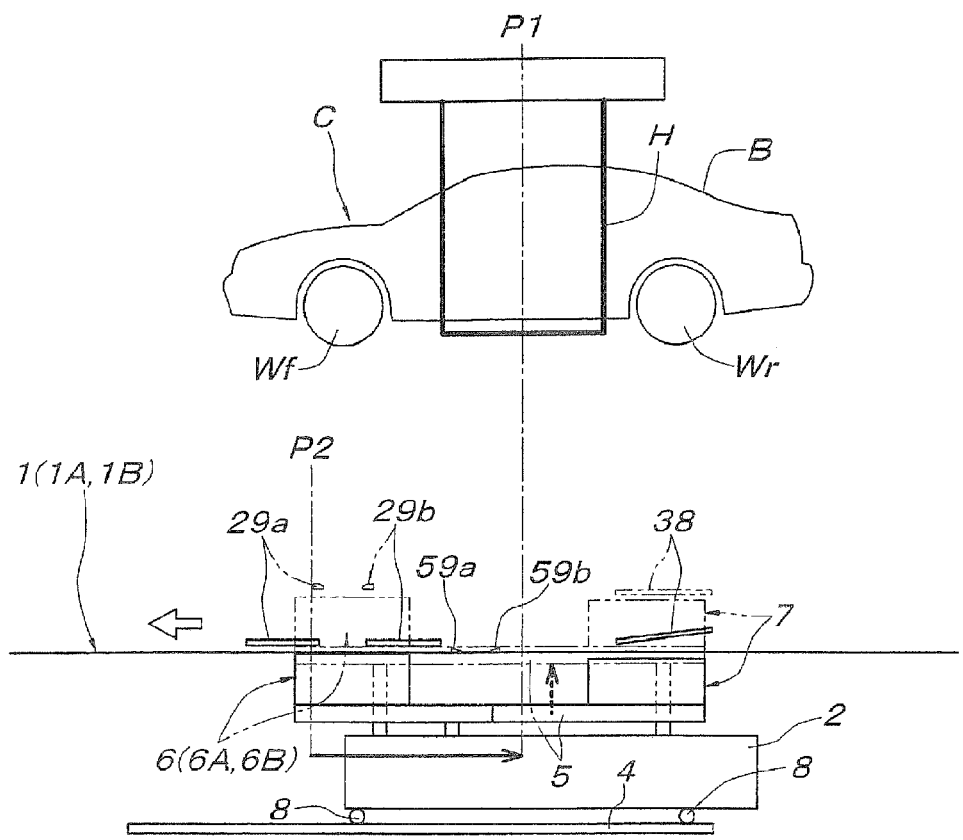

US 8,230,988 B2

APPARATUS FOR TRANSFERRING VEHICLES ONTO CONVEYOR

RELATED APPLICATION DATA

This Application is a U.S. National Stage filing under 35 U.S.C. §371 of International Application No. PCT/JP2009/000939, filed Mar. 2, 2009, which claims priority to Japanese Patent Application Serial No. 2008-063545, filed Mar. 13, 2008. Priority to the aforementioned applications is hereby expressly claimed in accordance with 35 U.S.C. §§119, 120, 365 and 371 and any other applicable statutes.

TECHNICAL FIELD

The present invention relates to an apparatus for transferring vehicles onto a conveyor, which is applicable to vehicles (e.g. vehicle bodies already mounted with wheels) brought in by a trolley conveyor or the like to be transferred onto a slat conveyor.

BACKGROUND ART

In case a vehicle body to which wheels are already mounted (hereinafter referred to as a "vehicle") is conveyed by a trolley conveyor in an automobile assembly line, the body of the vehicle is usually hanged by a hanger for conveyance, and for transferring the same onto a slat conveyor a vertically movable apparatus for transferring vehicles that receives vehicles from the hanger by supporting the wheels instead of the body of the vehicles is used. For such an apparatus for transferring vehicles onto a conveyor, a pair of front and rear wheel supporting arms that freely open and close in a horizontal manner between a closed posture for supporting the wheels at a predetermined position in terms of the convey direction and an opened posture for releasing the wheels to the convey direction are used as a wheel supporting means. However, for such a conventional apparatus for transferring vehicles onto a conveyor, both the front wheel supporting means supporting front wheels of the vehicle and the rear wheel supporting means supporting rear wheels of the vehicle are constituted of a pair of front and rear wheel supporting arms that freely open and close, as described in Japanese Patent Application No. 2007-18647.

Non Patent Citation 1: Japanese Patent Application No. 2007-018647

DISCLOSURE OF INVENTION

Task to be Solved by the Invention

Since, with the wheel supporting means constituted of a pair of front and rear wheel supporting arms that freely open and close, the position of the wheel supported by the pair of front and rear wheel supporting arms in the closed posture is determined at a definite position in terms of the convey direction, if the front wheel supporting means supporting front wheels of a vehicle as well as the rear wheel supporting means supporting rear wheels of the vehicle are both constituted of a pair of front and rear wheel supporting arms that freely open and close, the distance between the front and rear wheels must be constant. While, it is common to handle vehicles of various sizes having different distances between front and rear wheels in a modern automobile assembly line in recent years. Therefore in order to handle such vehicles of various sizes having different distances between the front and rear wheels with a single vehicle transferring apparatus, the same has been conventionally so structured that the distance between front wheel supporting means and the rear wheel supporting means be changeable as described in Japanese Patent Application No. 2007-18647. As the result, the structure of the transferring apparatus itself becomes complex and expensive, and further the cycle time for the transfer may become longer, because the distance between the front and rear wheel supporting means should be adjusted to the distance between the front and rear wheels of a vehicle to be handled in real time and accurately.

Means for Solving the Task

An object of the present invention is to provide an apparatus for transferring vehicles onto a conveyor having solved the aforedescribed conventional problems. The apparatus for transferring vehicles onto a conveyor as described in Claim 1 is, (expressed with the reference numerals used in the preferred embodiment described below), comprising an elevator 5 moving vertically with respect to the conveyor 1 that supports and conveys the vehicle C by means of wheels Wf and Wr; wherein the elevator 5 is provided with a front wheel supporting means 6 and a rear wheel supporting means 7 that support front wheels Wf and rear wheels Wr of the vehicle respectively in terms of the convey direction at a predetermined level above the conveyor 1; wherein either one of the front wheel supporting means 6 or the rear wheel supporting means 7 is provided with a pair of front and rear wheel supporting arms 29a and 29b that freely open and close in a horizontal direction between a closed posture supporting the wheels (front wheels Wf) at a predetermined position in terms of the convey direction and an opened posture releasing the wheels (the front wheels Wf) to the convey direction; and wherein the other one of the wheel supporting means 7 is provided with a wheel supporting plate 38 that supports the wheels (the rear wheels Wr) without determining the position thereof in terms of the convey direction so as to be able to switch the posture thereof between a horizontal posture and a front-down tilted posture in terms of the convey direction; and a posture switching means 40 that changes the posture of the wheel supporting plate 38 of the other wheel supporting means 7 to the tilted posture, at least when the elevator 5, which supportis the vehicle C with the wheel supporting arms 29a and 29b of one of the wheel supporting means 6 in the closed posture and the wheel supporting plate 38 of the other wheel supporting means 7 in the horizontal posture, is at the lowermost position for transferring the vehicle C onto the conveyor 1.

In implementing the present invention, as described specifically in Claim 2, the conveyor 1 may be constituted of a pair of left and right conveyor units 1A and 1B that support and convey the left or right wheels of the vehicle respectively; the elevator 5 may be installed between the two conveyor units 1A and 1B; said one of the wheel supporting means 6 may be provided with a set of left and right wheel supporting arms 29a and 29b mounted on the single elevator 5; and the other one of the wheel supporting means 7 may be provided with the single wheel supporting plate 38 supported by the single elevator 5 at the center thereof and extending over the left and right conveyor units 1A and 1B.

Further, as described in Claim 3, the elevator 5 may be mounted on a dolly 2 that moves parallel to the convey direction of the conveyor 1 in a reciprocal manner, so that the elevator 5 be moved reciprocatly by the reciprocal movement of the dolly 2 between a vehicle receiving position (the rearmost position P1) for receiving a vehicle C above the conveyor 1 and a vehicle transfer position (the forefront position P2) for transferring the vehicle C onto the conveyor 1.

Further, as described in Claim 4, the wheel supporting plate 38 of the other one of the wheel supporting means 7 is so supported that the rear edge thereof in terms of the convey direction can move up and down about the front edge thereof as a fulcrum (a left-to-right horizontal spindle 49), and a pushing-up device 52 is erected on a side for supporting the elevator 5 (the dolly 2) such that the device 52 pushes up the rear edge of the wheel supporting plate 38 by a relative descending movement of the elevator 5 so that the wheel supporting plate 38 takes the tilted posture when the elevator 5 arrives at the lowermost position, and the posture switching means 40 may be constituted of the pushing-up device 52.

Further, as described in Claim 5, the apparatus further comprises a lifting means 41 for lifting up the front edge of the wheel supporting plate 38 of the other wheel supporting means 7 in the tilted posture to a predetermined level above the conveyor 1, when the elevator 5 is at least at the lowermost position for transferring a vehicle C onto the conveyor 1 and after wheels (the rear wheels Wr) have moved onto the conveyor 1 from the wheel supporting plate 38 in the tilted posture. In this case, as described in Claim 6, the wheel supporting plate 38 of the other one of the wheel supporting means 7 is so supported that the rear edge thereof in terms of the convey direction can move up and down about the front edge thereof as a fulcrum (a left-to-right horizontal spindle 49), a pushing-up device 52 is erected on a side for supporting the elevator 5 (the dolly 2) such that the device 52 pushes up the rear edge of the wheel supporting plate 38 by a relative descending movement of the elevator 5 so that the wheel supporting plate 38 takes the tilted posture when the elevator 5 arrives at the lowermost position, and thus the posture switching means 40 is constituted of the pushing-up device 52; and rollers 51a and 51b are supported at the front edge of the wheel supporting plate 38, which function as a fulcrum, in terms of the convey direction, so that the rollers can roll back and forth on a supporting face 50 provided on the side for supporting the elevator 5 (the dolly 2), and the lifting means 41 may be constituted of a pusher 57 that pushes up the front edge of the wheel supporting plate 38 and an actuator 58 that drives the pusher 57 to move up and down with respect to the elevator 5.

Effects of the Invention

According to the apparatus for transferring vehicles onto a conveyor of the present invention as described in Claim 1, with the situation that front wheels and rear wheels of a vehicle are supported, respectively, by the front wheel supporting means and the rear wheel supporting means on the elevator at an elevated position, the front wheel supporting means and the rear wheel supporting means are lowered to the lowermost position close to the conveyor, while keeping the position, a pair of front and rear wheel supporting arms that can open and close either one of the front and rear wheel supporting means is opened from the closed posture for supporting the wheels to the opened posture to transfer the wheels supported by the pair of the front and rear wheel supporting arms onto the conveyor. At this moment, since the posture of the wheel supporting plate of the other wheel supporting means has been changed to the front-down tilted posture by the posture switching means, the wheels having been already transferred onto the conveyor are dragged by the conveyor to the convey direction and the wheels remaining on the wheel supporting plate can smoothly roll down to the convey direction to be transferred to the conveyor, assisted by the front-down inclination of the wheel supporting plate.

In other words, since only one wheel supporting means out of the front and rear wheel supporting means is constituted of a pair of front and rear wheel supporting arms that open and close horizontally and support wheels at a predetermined position, and the other wheel supporting means supports wheels on the wheel supporting plate without determining the position of the wheels in terms of the convey direction. Therefore, any vehicles having the distances between the front and rear wheels varying within the range of the width (length) of the wheel supporting plate in terms of the convey direction can be safely transferred onto the conveyor under the condition that the vehicles are surely positioned at a predetermined position with reference to the wheels supported by the pair of the front and rear wheel supporting arms in the closed posture.

Furthermore, since the wheel supporting plate is kept in the horizontal posture from the receipt of vehicle at a predetermined height above the conveyor until the arrival thereof at the lowermost position where the vehicle is transferred onto the conveyor, the supported vehicle is not subjected to a driving force into the convey direction, as in the case of the support of the wheels by a wheel supporting plate inclined front-down from the beginning, and the vehicle can be lowered safely to be transferred onto the conveyor, even if the engagement depth of the wheels into the pair of the front and rear wheel supporting arms in the closed posture is shallow. Contrary, when vehicles should be transferred onto the conveyor by letting the wheels rolling down from the wheel supporting plate in the horizontal posture to the convey direction, a considerably strong driving force should be given to the vehicles through the wheels having been transferred to the conveyor earlier. Consequently, very low profiled wheel positioning bars placed on the conveyor so as to hold both the front and rear sides of the ground contact patch of the wheels may not able to transfer the vehicle keeping it at a predetermined position of the conveyor, instead the bars may pass under the wheel due to the resistance in dragging out the wheels to the convey direction from the wheel supporting plate in the horizontal posture. In contrast, since the wheel supporting plate is tilted front-down at the stage of transferring the vehicle onto the conveyor giving a traveling force to the wheels on the wheel supporting plate in the direction for transferring it onto the conveyor, even with the very low-profiled wheel positioning bars provided on the conveyer, the vehicles on the conveyor are able to be surely carried, positioning the wheels at a predetermined position.

By the constitution according to Claim 2, compared to the case where elevators moving synchronized up and down are installed on both left and right sides of the conveyor, the structure of the whole apparatus can be simpler, and the present invention can be implemented simply and inexpensively.

Further, by the constitution according to Claim 3, compared to the constitution where vehicles are transferred onto the conveyor exactly below the vehicle receiving position above the conveyor, the next vehicle can be carried to the vehicle receiving position above the conveyor during the transportation of the vehicle received at the vehicle receiving position above the conveyor to a lower forward position, even if the vertical space between the vehicle receiving position above the conveyor and the conveyor is so small that the vehicle waiting at the vehicle receiving position above the conveyor could interfere with the vehicle being transferred onto the conveyor, thus the cycle time for transferring vehicles onto the conveyor can be shortened.

Further, by the constitution according to Claim 4, it is not necessary to install an actuator, such as a motor and a cylinder unit, for tilting the wheel supporting plate on the elevator or on the side where the elevator is supported, which makes the structure of the whole apparatus simpler compared to the case where installment of such actuator is necessary, and the present invention can be implemented simply and inexpensively. In this connection, when the front edge of the wheel supporting plate is driven vertically to change the posture, the supporting level of wheels on the wheel supporting plate in the horizontal posture becomes high, and therefore the vehicle is supposed to be lowered on to the conveyor while being supported in an inclined posture from the beginning. On the contrary, by the constitution according to Claim 4, since the wheel supporting plate is switched to the tilted posture by pushing up the rear edge thereof, the supported vehicle can be supported substantially horizontal until just before the transfer of the vehicle onto the conveyor, and the vertical conveyance of the supported vehicle down to the conveyor can be carried out safely.

Further, by the constitution according to Claim 5, when the elevator is at the lowermost position, interference between the front edge of the front-down tilted wheel supporting plate which is close to the conveyor and the wheel positioning bar on the conveyor coming from the rear side can be prevented by pushing up the front edge of the wheel supporting plate to the predetermined level above the conveyor by the lifting means. Therefore there is no danger of collision between the bottom of the vehicle body and the wheel supporting means, even if the ground clearance under the vehicle is narrow, as in the case that the elevator is lifted up by a predetermined height to avoid such an interference between the front edge of the wheel supporting plate and the wheel positioning bars. Further it becomes possible to dispose the wheel positioning bars onto the conveyor at a narrower interval than the vehicle conveying interval. In this case, by the constitution according to Claim 6, the advantage to be enjoyed by the constitution according to Claim 4 can be also obtained.

BEST MODE FOR CARRYING OUT THE INVENTION

A specific embodiment of the present invention will be explained with the accompanied figures hereto. In FIGS. 1 to 4, a slat conveyor 1, which receives and conveys a vehicle C, is constituted of a pair of left and right slat conveyor units 1A and 1B as shown in FIGS. 3 and 4. A dolly 2 is retained, being reciprocatingly movable along the conveying direction of the slat conveyor 1 between the pair of left and right slat conveyor units 1A and 1B below the level thereof on a pair of guide rails 4 on a mount 3 built on a floor. An elevator 5 is supported being vertically movable on the dolly 2 so that the same can move up and down between the pair of left and right slat conveyor units 1A and 1B. On the elevator 5 are mounted a front wheel supporting means 6 and a rear wheel supporting means 7.

Particulars of each component will be explained below. As shown in FIGS. 5 and 6, the dolly 2 is provided with two sets of front and rear pairs of left and right travelling wheels 8 running on the pair of left and right guide rails 4 laid on the mount 3; two sets of front and rear pairs of left and right vertically-axis rollers 9 sandwiching one of the guide rails 4 to prevent rolling, and two sets of front and rear pairs of left and right horizontally-axis rollers 11, which is closed to a undersurface of a pair of left and right platy rails 10, built protruding horizontally from the top of the mount 3 between the guide rails 4 to prevent uplifting. By virtue of these wheels 8 and rollers 9 and 11 is the dolly 2 retained freely movable reciprocatingly on a horizontal linear track, which is parallel to the convey direction of the slat conveyor 1, between stoppers 12a and 12b disposed at the rear and front ends of the mount 3. As a driving means 13 for the travel of the dolly 2, are provided a rack gear 14 outside one of the guide rails 4 and parallel thereto on the mount 3 facing sideways, a pinion gear 15 engaging the rack gear 14, and a motor 16 with a reduction gear, whose vertical drive axle is connected with the pinion gear 15, mounted on the side of the dolly 2. According to the above constitution the dolly 2 can be driven back and forth along the guide rails 4 by rotating the pinion gear 15 forward and reverse by the motor 16.

As shown in FIGS. 1 to 6, the elevator 5 is supported by means of a pair of rear and front elevation driving means 17A and 17B on the dolly 2. The elevation driving means 17A and 17B have the same structures, each being constituted of: an elevation guiding rod 19, the upper end thereof being fixed to the elevator 5 and extending therefrom vertically downward and penetrating vertically through a casing 18 mounted on the dolly 2; a pair of upper and lower elevation guides 20 mounted on the casing 18 to support the elevation guiding rod 19 allowing the same to move only up and down along the axis direction; a tubular cover 21 downward covering the elevation guiding rod 19 for extending from the dolly 2; a pinion gear 24 rotatably supported in the casing 18 via a horizontal rotating shaft 23 to engage with a rack gear 22 formed on the elevation guiding rod 19; a interlocking shaft 25 for connecting the pinion gears 24 of both the elevation driving means 17A and 17B through the horizontal rotating shafts 23; and a motor 26 with a reduction gear mounted on the dolly 2 rotating forward and reverse the pinion gear 24 of an elevation driving means 17A through the horizontal rotating shafts 23. On each of the casings 18 for the elevation driving means 17A and 17B, a stopper 27 is fixed protruding upward to determine the lowest position of the elevator 5. Accordingly, both the elevation guiding rods 19 of the elevation driving means 17A and 17B are lifted or lowered synchronically by driving the pinion gears 24 of the elevation driving means 17A and 17B forward and reverse by the motor 26 through the horizontal rotating shafts 23 and the interlocking shaft 25, so that the elevator 5 can be lifted or lowered flatly.

The front wheel supporting means 6 is mounted on the front edge of the elevator 5 and provided with a pair of left and right wheel supporting means 6A and 6B, and a driving means 28 thereof as shown in FIGS. 7 and 8. The pair of the left and right wheel supporting means 6A and 6B is constructed left-right symmetrically, and each of them is equipped with a pair of front and rear wheel supporting arms 29a and 29b, which can open or close horizontally. Each pair of the front and rear wheel supporting arms 29a and 29b are fixed at the ends thereof to the top ends of a pair of front and rear vertical pivoting shafts 30a and 30b, respectively, which are pivotably supported near the left or right side edge of the elevator 5. Thereby the vertical pivoting shafts 30a and 30b are interlocked together to forcibly counter rotate by a pair of gears 31a and 31b engaging each other fixed near the lower edges of the shafts, and a cam follower roller 33 is pivotably supported by a vertical spindle at the tip of an actuated lever 32 extended from the vertical pivoting shaft 30a inwardly. The driving means 28 is constituted of a slide rail 34 laid on the elevator 5 in the middle of the pair of the left and right wheel supporting means 6A and 6B, a back and forth moving body 35 supported on the slide rail 34 slidably back and forth horizontally, and a cylinder unit 36 mounted between the back and forth moving body 35 and the elevator 5 to drive the moving body 35 back and forth.

At the left and right side edges of the back and forth moving body 35, cam grooves 37a and 37b are formed to receive the cam follower rollers 33 of the actuated levers 32 for the pair of the left and right wheel supporting means 6A and 6B with a clearance. Consequently, when the back and forth moving body 35 is moved backward or forward, the actuated levers 32 drives the vertical pivoting shafts 30a to be reverse-rotated by means of the cam grooves 37a and 37b and the cam follower rollers 33 engaged therewith, and the vertical pivoting shafts 30a and 30b are reverse-rotated synchronically through the gears 31a and 31b, then the pairs of the front and rear wheel supporting arms 29a and 29b rotate horizontally about the vertical pivoting shafts 30a and 30b to open or close the arms. More particularly, it is so structured that, when the back and forth moving body 35 is returned to a rearmost position by the cylinder unit 36 as indicated by the solid lines in FIG. 7, the pairs of the front and rear wheel supporting arms 29a and 29b take an opened posture spreading out horizontally in opposite directions apart from the vertical pivoting shafts 30a and 30b existing, by plan view, inwardly apart from the slat conveyor units 1A and 1B; and when the back and forth moving body 35 is moved forward by the cylinder unit 36 to a forefront position as indicated by the imaginary lines in FIG. 7, the cam follower rollers 33 are pushed out from the cam grooves 37a and 37b to move the location touching the left and right outer side surfaces of the back and forth moving body 35, thereby turning the pairs of the front and rear wheel supporting arms 29a and 29b extending horizontally substantially sideways from the vertical pivoting shafts 30a and 30b to take a closing posture, in which the pairs of the front and rear wheel supporting arms 29a and 29b existing, by plan view, on the slat conveyor units 1A and 1B parallel to each other. Furthermore, protrusions 35a and 35b are formed on the back and forth moving body 35 to return the cam follower rollers 33 into the cam grooves 37a and 37b, when the back and forth moving body 35 moves from the forefront position to the rearmost position.

The rear wheel supporting means 7 is mounted on the rear edge of the elevator 5 and is constituted as shown in FIGS. 7 and 8 of: an oblong planar wheel supporting plate 38 disposed sideways with both side portions overlapping by plan view the slat conveyor units 1A and 1B; a supporting means 39 supporting the wheel supporting plate 38 tiltably between a horizontal posture and a front-down tilted posture by side view; a posture switching means 40 for the wheel supporting plate 38; and a lifting means 41 lifting the front edge of the wheel supporting plate 38 to a predetermined height.

The supporting means 39 is constituted as shown in FIGS. 7 to 11 of: a pair of left and right elevating rods 43a and 43b supported vertically movably at the rear edge of the elevator 5 protruding upwards by a pair of left and right elevation guides 42a and 42b standing; a pair of left and right supporting shafts 44a and 44b standing on the elevator 5 forward of the pair of the left and right elevation guides 42a and 42b; a base plate 47 with a pair of left and right bearings 46a and 46b being fixed to the undersurface near the rear edge thereof, which are pivotably supported on the top ends of the pair of the left and right elevating rods 43a and 43b by a left-to right horizontal spindles 45 being arranged concentrically each other; and a pair of left and right horizontal axis rollers 51a and 51b supported by a pair of left and right bearings 48a and 48b pivotably and concentrically each other through a left-to-right horizontal spindles 49 being arranged concentrically each other, wherein the bearings 48a and 48b are fixed to the undersurface near the front edge of the base plate 47, and the horizontal axis rollers 51a and 51b can rest rollably on a horizontal supporting faces 50 at the top of the pair of the left and right supporting shafts 44a and 44b, and wherein the base plate 47 is fixed to the central portion of the undersurface of the wheel supporting plate 38. According to such a constitution, when the pair of the left and right elevation guides 42a and 42b descend and the bearings 46a and 46b are supported at the top of the elevation guides 42a and 42b, as well as the pair of the left and right horizontal axis rollers 51a and 51b rest on the horizontal supporting faces 50 at the top of the supporting shafts 44a and 44b, the wheel supporting plate 38 takes a horizontal posture.

The posture switching means 40 is constituted of a pushing-up device 52. The device 52 is fixed on the side of the dolly 2, more specifically on the casing 18 of the rear elevation driving means 17B, so that, when the elevator 5 descends from the uppermost position shown in FIGS. 1 and 9A to the lowermost position shown in FIGS. 2 and 9B with respect to the dolly 2, the rear edge of the wheel supporting plate 38, namely the vicinity of the rear edge of the undersurface of the base plate 47, taking a horizontal posture at the final descending stage touches the pushing-up device 52. The pushing-up device 52 is constituted of a pair of height-adjustable left and right stopper bolts 54a and 54, which is fixed on the top of a supporting member 53 erected on the casing 18. As the result, when the elevator 5 descends towards the dolly 2 to the lowermost position, at the final descending stage the undersurface of the rear edge of the wheel supporting plate 38 (the rear edge of the base plate 47) taking a horizontal posture touches the pair of the left and right stopper bolts 54a and 54b of the pushing-up device 52; during further descending of the elevator 5 to the lowermost position the rear edge of the wheel supporting plate 38 in the horizontal posture is relatively pushed up by the pair of the left and right stopper bolts 54a and 54b of the pushing-up device 52, so that the wheel supporting plate 38 tilts upward about the fulcrum of a left-to-right horizontal spindle 49 of the front horizontal axis rollers 51a and 51b; and upon arrival of the elevator 5 at the lowermost position with respect to the dolly 2, the posture of the wheel supporting plate 38 is changed to take a front-down tilted posture as shown in FIGS. 2 and 9B.

The lifting means 41 is mounted on the elevator 5 just in front of the wheel supporting plate 38, and constituted of a pusher 57 protruded upward from the rear edge of a lifting plate 56, which is supported vertically movable by a pair of front and rear elevation guiding rods 55, and an actuator 58, such as a cylinder unit, for driving the lifting plate 56 up and down. Accordingly, when the lifting plate 56 is lowered to the lowermost position, the pusher 57 is off and below the front edge of the undersurface of the wheel supporting plate 38 (the front edge of the base plate 47) in the horizontal posture, and does not interfere with the front edge of the undersurface of the wheel supporting plate 38 (the front edge of the base plate 47), which is slightly lowered when the posture of the wheel supporting plate 38 is changed from the horizontal posture to the tilted posture by the pushing-up device 52 of the posture switching means 40 as described above. However, when an actuator 58 is activated to lift up the lifting plate 56 and to raise the pusher 57 to a pre-determined height as shown in FIG. 11, the front edge of the wheel supporting plate 38 (the front edge of the base plate 47) is pushed up by the pusher 57, and the wheel supporting plate 38 is tilted about the fulcrum of the left-to right horizontal spindle 45 which is an interlocking spindle between the elevating rods 43a and 43b and the base plate 47, raising the front edge of the wheel supporting plate 38 to a pre-determined height. Thereby the front horizontal axis rollers 51a and 51b at the front edge of the wheel supporting plate 38 are off and above the horizontal supporting faces 50 at the top of the supporting shafts 44a and 44b decreasing the tilt angle of the wheel supporting plate 38.

A method for utilizing the vehicle transferring apparatus to a conveyor constituted as mentioned above will be described below. When the dolly 2 is at the rearmost position P1 (see FIG. 12) and the elevator 5 is at the uppermost position, the front wheel supporting means 6 and the rear wheel supporting means 7 are positioned at a vehicle receiving position at a predetermined height above the slat conveyor 1 as shown in FIGS. 1 and 12. Thereby the pairs of the front and rear wheel supporting arms 29a and 29b of the pair of the left and right wheel supporting means 6A and 6B of the front wheel supporting means 6 take the closed posture extending the arms sideways over the slat conveyor units 1A and 1B as indicated by imaginary lines in FIG. 7, and the wheel supporting plate 38 of the rear wheel supporting means 7 takes the horizontal posture, while the elevating rods 43a and 43b of the supporting means 39 being at the lowermost position. With such a position, for example as shown in FIG. 12, a vehicle C whose body B is supported by a hanger H of a trolley conveyor, is lowered with respect to the elevator 5 by letting the hanger H descend to place wheels located at a front position in terms of the convey direction of the slat conveyor 1, namely a pair of front wheels Wf in the referred figure, between the pair of the front and rear wheel supporting arms 29a and 29b in the closed posture of the pair of the left and right wheel supporting means 6A and 6B of the front wheel supporting means 6, and to place wheels located at a rear position in terms of the convey direction of the slat conveyor 1, namely a pair of rear wheels Wr in the referred figure, onto the wheel supporting plate 38 of the rear wheel supporting means 7. In this position the vehicle C is in a substantially horizontal posture.

Once the vehicle C is supported on the elevator 5 by means of the front wheels Wf and the front wheel supporting means 6, and the rear wheels Wr and the rear wheel supporting means 7, the hanger H is further slightly lowered, opened, lifted up to the original level and retired to prepare for the entry of the next vehicle C. Notwithstanding the above, the transferring method of a vehicle C to the front wheel supporting means 6 and the rear wheel supporting means 7 located at the vehicle receiving position is not limited to the above, but for example, instead that the hanger H of a trolley conveyor be lowered together with the vehicle C, another lifting apparatus, which receives the vehicle C from the hanger H and lowers the same, may be used to lower and transfer the vehicle C to the front wheel supporting means 6 and the rear wheel supporting means 7 located at the vehicle receiving position as mentioned above.

Upon completion of the transfer of the vehicle C to the front wheel supporting means 6 and the rear wheel supporting means 7 located at the vehicle receiving position, the dolly 2 together with the elevator 5 is advanced to the forefront position P2 by the driving means 13 for the travel as shown in FIGS. 2 and 13, and the elevator 5 is lowered toward the dolly 2 from the uppermost position to the lowermost position by activating the pair of the elevation driving means 17A and 17B by the motor 26 with a reduction gear. When the elevator arrives at the lowermost position, the wheel supporting plate 38 of the rear wheel supporting means 7 is automatically changed to the front-down tilted posture by the pushing-up device 52 of the posture switching means 40. Thereby the wheel supporting plate 38 takes the front-down tilted posture not by lowering the front edge, but by pushing up the rear edge, and consequently the vehicle C becomes slightly tilted rear-side up, and the gravity force worked on the rear wheels Wr supported by the front-down tilted wheel supporting plate 38 gives a traveling force to the vehicle C in the advancing direction. However, the force is not so large as to make the front wheels Wf fall down frontwardly from the pair of the front and rear wheel supporting arms 29a and 29b in the closed posture of the pair of the left and right wheel supporting means 6A and 6B of the front wheel supporting means 6, and therefore the vehicle C can be supported by the front wheel supporting means 6 and the rear wheel supporting means 7 in a stable manner.

When the dolly 2 is at the forefront position P2 and the elevator 5 is lowered to the lowermost position, the front wheel supporting means 6 and the rear wheel supporting means 7 can take a vehicle transfer position at the predetermined level slightly higher than the slat conveyor 1. More specifically, the pairs of the front and rear wheel supporting arms 29a and 29b in the closed posture of the pair of the left and right wheel supporting means 6A and 6B of the front wheel supporting means 6 support the vehicle in such a manner that the front wheels Wf engaged between the pairs of the front and rear wheel supporting arms 29a and 29b in the closed posture is at a level slightly lifted up from the wheel supporting face of the slat conveyor 1, and the front edge of the front-down tilted wheel supporting plate 38 of the rear wheel supporting means 7 is at a level slightly lifted up from the wheel supporting face of the slat conveyor 1. Meanwhile, as shown in FIGS. 1 to 4, 7 and 12 to 16, a pair of front and rear wheel positioning bars 59a and 59b are generally provided at an appropriate interval in the convey direction on the wheel supporting face of the slat conveyor 1 (the slat conveyor units 1A and 1B), so that the supported wheel (the front wheel Wf) should not move back and forth. Therefore, the front wheel supporting means 6 and the rear wheel supporting means 7 should be so regulated that they should arrive at the vehicle transfer position, when the pair of the wheel positioning bars 59a and 59b pass below the wheel supporting plate 38 of the rear wheel supporting means 7 frontward and approaches the front wheel Wf supported by the front wheel supporting means 6.

In this manner, when the pair of the wheel positioning bars 59a and 59b on the slat conveyor 1 arrive just beneath the front wheel Wf supported by the front wheel supporting means 6, the pairs of the front and rear wheel supporting arms 29a and 29b in the closed posture of the pair of the left and right wheel supporting means 6A and 6B of the front wheel supporting means 6 are switched to the opened posture as shown in FIG. 7 shown by the solid lines and in FIG. 14, by activating the driving means 28 as described above, so that the front wheels Wf engaged between the pairs of the front and rear wheel supporting arms 29a and 29b in the closed posture fall slightly down to be supported between the pairs of the front and rear wheel positioning bars 59a and 59b on the wheel supporting face of the slat conveyor 1. Consequently the vehicle C receives a driving force from the slat conveyor 1 in the convey direction through the front wheels Wf, and starts moving together with the slat conveyor 1 in the convey direction, while the rear wheels Wr roll down on the front-down tilted wheel supporting plate 38 of the rear wheel supporting means 7 without disturbing the movement of the vehicle C in the convey direction together with the slat conveyor 1.

When the vehicle C is transferred completely onto the slat conveyor 1 and starts being conveyed by the slat conveyor 1 as shown in FIG. 15, the front edge of the front-down tilted wheel supporting plate 38 of the rear wheel supporting means 7 is raised by the pusher 57 of the lifting means 41 to the pre-determined height, namely the height not interfering with the wheel positioning bars 59a and 59b on the slat conveyor 1. By moving the dolly 2 backward from the forefront position P2 to the original rearmost position P1 in such a condition, even if the wheel positioning bars 59a and 59b have to pass under the front-down tilted wheel supporting plate 38 under the conditions that the pairs of the front and rear wheel supporting arms 29a and 29b in the opened posture of the pair of the left and right wheel supporting means 6A and 6B of the front wheel supporting means 6 have not passed completely rearward from the downward region of the vehicle C where it has started being conveyed by the slat conveyor 1, and that the dolly 2 should be moved backward with the elevator 5 staying at the lowermost position, no interference occurs between the wheel positioning bars 59a and 59b and the wheel supporting plate 38. In other words, even when the elevator 5 is at the lowermost position, the front edge of the front-down tilted wheel supporting plate 38 of the rear wheel supporting means 7 can be close enough to the wheel supporting face of the slat conveyor 1, so that transfer of the rear wheels Wr from the wheel supporting plate 38 to the slat conveyor 1 can be vehicleried out safely and smoothly.

When the dolly 2 is retreated to the rearmost position P1 as shown in FIG. 16, the elevator 5 is lifted to the uppermost position with respect to the dolly 2 as shown in FIG. 16 by imaginary lines and FIG. 12, the pairs of the front and rear wheel supporting arms 29a and 29b in the opened posture of the pair of the left and right wheel supporting means 6A and 6B of the front wheel supporting means 6 are switched to the closed posture again, and the pusher 57 of the lifting means 41 that has pushed up the front edge of the wheel supporting plate 38 of the rear wheel supporting means 7 is lowered to the waiting position. With the rise of the elevator 5 with respect to the dolly 2, the rear edge of the wheel supporting plate 38 rises away from the pushing-up device 52 of the posture switching means 40, and the wheel supporting plate 38 automatically returns from the front-down tilted posture to the horizontal posture to complete the preparation for receiving the next vehicle C.

Although the slat conveyor 1 is exemplified as a conveyor to receive and convey vehicles C, any other conveyor type, for example a roller conveyor, may be used insofar as the type supports and conveys the while C by means of wheels Wf or Wr. Further, the elevator 5 may be constituted of a pair of left and right elevators located on both the sides of the conveyor moving up and down in a synchronized manner, or may possibly be a single elevator located at one side of the conveyor. In the former case, the pair of the left and right wheel supporting means 6A and 6B constituting the front wheel supporting means 6 may be allocated dividedly to the pair of left and right elevators, and the wheel supporting plate 38 of the rear wheel supporting means 7 may be a single wheel supporting plate 38 installed bridging the pair of the left and right elevators, or constituted of a pair of left and right wheel supporting plates 38 allocated dividedly to the pair of left and right elevators. Furthermore, although a dolly 2 is used in the above embodiment, it is possible to set it up so that a vehicle C be lowered vertically without using the dolly 2 but using only an elevator 5 for transferring it onto the conveyor 1.

Since the lifting means 41 for pushing up the front edge of a wheel supporting plate 38 of the rear wheel supporting means 7 exerts an effect, in case the wheel positioning bars 59a and 59b are provided to define the wheel positions on the wheel supporting face of the conveyor, the lifting means 41 may be omitted, in case a combination with a conveyor without the wheel positioning bars 59a and 59b is contemplated. Furthermore, since the lifting amount of the front edge of the wheel supporting plates 38 is rather limited, even in the case where the combination of a conveyor with the wheel positioning bars 59a and 59b is contemplated, it is possible to omit the lifting means 41 by regulating to lift the elevator 5 to the height so as to make it possible to avoid the interference between the wheel positioning bars 59a and 59b and the front edge of the front-down tilted wheel supporting plates 38, subject to the clearance below vehicle C (height from the floor) to be handled.

Instead of the constitution that the rear edge of the wheel supporting plates 38 is lifted to tilt the wheel supporting plates 38 front-down, it may be constituted so that the front edge of the wheel supporting plates 38 is lowered to tilt the wheel supporting plates 38 front-down, or it is also possible to lower the front edge of the wheel supporting plates 38 and simultaneously to lift the rear edge to tilt the wheel supporting plates 38 front-down. In any case it is possible to install a driving actuator for lifting, such as a cylinder unit, between the wheel supporting plates 38 and the elevator 5, in order to tilt the wheel supporting plates 38 front-down.

If the direction of a vehicle C conveyed on the conveyor 1 is reversed back to front, the rear wheel Wr of the vehicle C may be supported by the front wheel supporting means 6, and the front wheel Wf of the vehicle C by the rear wheel supporting means 7 for transfer it onto the conveyor 1. It is also possible to dispose a rear wheel supporting means 7 with a wheel supporting plate 38 at the front edge of the elevator 5 (the downstream edge in terms of the convey direction of the conveyor 1), and a pair of the left and right wheel supporting means 6A and 6B with pairs of front and rear wheel supporting arms 29a and 29b at the rear edge of the elevator 5.

BRIEF DESCRIPTION OF DRAWINGS

FIG. 1 is a side view of the apparatus after receipt of a vehicle;

FIG. 2 is a side view of the apparatus just before transfer of a vehicle to a slat conveyor;

FIG. 3 is a front view of the apparatus in the condition of FIG. 1;

FIG. 4 is a front view of the apparatus in the situation of FIG. 2;

FIG. 5 A is a plan view of a mount; B is a plan view of a dolly; and C is a plan view of an elevator;

FIG. 6 is a vertical sectional front view in vertical section partially, showing an elevation driving means for an elevator and a driving means for travel of a dolly;

FIG. 7 is a plan view of the apparatus showing front and rear wheel supporting means;

FIG. 8 is a partial vertical sectional view front and rear wheel supporting means;

FIG. 9 A is a rear side view of a rear wheel supporting means at the uppermost position; and B is a rear side view of a rear wheel supporting means at the lowermost position;

FIG. 10 is a front view of a rear wheel supporting means;

FIG. 11 is a partially cut-away side view of a rear wheel supporting means;

FIG. 12 is a schematic side view for explaining the first stage of receiving a vehicle;

FIG. 13 is a schematic side view for explaining the second stage of lowering a vehicle to a predetermined level above a slat conveyor;

FIG. 14 is a schematic side view for explaining the third stage just after placing vehicle onto a slat conveyor;

FIG. 15 is a schematic side view for explaining the fourth starting just after starting conveyance of a vehicle by a slat conveyor; and FIG. 16 is a schematic side view describing the last stage after returning a transfer apparatus to an original position.

EXPLANATION OF REFERENCE

1: SLAT CONVEYOR
1A, 1B: SLAT CONVEYOR UNIT
2: DOLLY
3: MOUNT
4: GUIDE RAIL FOR DOLLY
5: ELEVATOR
6: FRONT WHEEL SUPPORTING MEANS
6A, 6B: WHEEL SUPPORTING MEANS
7: REAR WHEEL SUPPORTING MEANS
13: DRIVING MEANS FOR TRAVEL OF DOLLY
16, 26: MOTOR WITH A REDUCTION GEAR
17A, 17B: ELEVATION DRIVING MEANS FOR AN ELEVATOR
19: ELEVATION GUIDING ROD
22: RACK GEAR
24: PINION GEAR
25: INTERLOCKING SHAFT
28: DRIVING MEANS
29a, 29b: PAIR OF FRONT AND REAR WHEEL SUPPORTING ARMS
30a, 30b: PAIR OF FRONT AND REAR VERTICAL PIVOTING SHAFTS
31a, 31b: PAIR OF GEARS
32: ACTUATED LEVER
33: CAM FOLLOWER ROLLER
34: SLIDE RAIL
35: BACK AND FORTH MOVING BODY
36: CYLINDER UNIT
37a, 37b: CAM GROOVE
38: WHEEL SUPPORTING PLATE
39: SUPPORTING MEANS
40: POSTURE SWITCHING MEANS
41: LIFTING MEANS
43a, 43b: ELEVATING ROD
44a, 44b: SUPPORTING SHAFT
47: BASE PLATE
50: HORIZONTAL SUPPORTING FACE
51a, 51b: HORIZONTAL AXIS ROLLER
52: PUSHING-UP DEVICE
54a, 54b STOPPER BOLT
56: LIFTING PLATE
57: PUSHER
58: ACTUATOR
59a, 59b WHEEL POSITIONING BAR

The invention claimed is:

1. An apparatus for transferring vehicles onto a conveyor, comprising:
an elevator moving vertically with respect to the conveyor that supports and conveys vehicles by means of wheels; wherein the elevator is provided with a front wheel supporting means and a rear wheel supporting means that support front wheels and rear wheels of the vehicles respectively in terms of the convey direction at a predetermined level above the conveyor; wherein either one of the front wheel supporting means and the rear wheel supporting means is provided with a pair of front and rear wheel supporting arms that freely open and close in a horizontal direction between a closed posture for supporting the wheels at a predetermined position in terms of the convey direction and an opened posture for releasing the wheels to the convey direction; and wherein the other one of the wheel supporting means is provided with a wheel supporting plate that supports the wheels of the vehicles without determining the position thereof in terms of the convey direction so as to be able to switch the posture thereof between a horizontal posture and a front-down tilted posture in terms of the convey direction; and
a posture switching means that changes the posture of said other one of the wheel supporting means to the tilted posture at least when the elevator, which supports a vehicle with the wheel supporting arms of said one of the wheel supporting means in the closed posture and the wheel supporting plate of the other one of the wheel supporting means in the horizontal posture, is at a lowermost position for transferring the vehicle onto the conveyor.

2. An apparatus for transferring vehicles onto a conveyor according to claim 1, wherein the conveyor is constituted of a pair of left and right conveyor units that support and convey the left or right wheels of the vehicle respectively, the elevator is installed between the two conveyor units; said one of the wheel supporting means is provided with a set of left and right wheel supporting arms mounted on the single elevator, and the other one of the wheel supporting means is provided with the single wheel supporting plate supported by the single elevator at the center thereof and extending over the left and right conveyor units.

3. An apparatus for transferring vehicles onto a conveyor according to claim 1, wherein the elevator is mounted on a dolly that moves parallel to the convey direction of the conveyor in a reciprocal manner, and the elevator is moved reciprocatingly by the reciprocal movement of the dolly between a vehicle receiving position above the conveyor for receiving vehicles and a vehicle transfer position for transferring vehicles onto the conveyor.

4. An apparatus for transferring vehicles onto a conveyor according to of claim 1, wherein the wheel supporting plate of said other one of the wheel supporting means is so supported that the rear edge thereof in terms of the convey direction can move up and down about the front edge thereof as a fulcrum; and wherein a pushing-up device is provided on a side for supporting said elevator such that said pushing-up device pushes up the rear edge of the wheel supporting plate by a relative descending movement of the elevator so that the wheel supporting plate takes the tilted posture when the elevator arrives at the lowermost position, and the posture switching means is constituted of said pushing-up device.

5. An apparatus for transferring vehicles onto a conveyor according to claim 1, further comprising a lifting means for lifting the front edge of the wheel supporting plate of said other one of the wheel supporting means in the tilted posture to a predetermined level above the conveyor, when the elevator is at least at the lowermost position for transferring vehicles onto the conveyor and after the wheels have moved onto the conveyor from the wheel supporting plate in the tilted posture.

6. An apparatus for transferring vehicles onto a conveyor according to claim 5, wherein the wheel supporting plate of the said other one of the wheel supporting means is so supported that the rear edge thereof in terms of the convey direction can move up and down about the front edge thereof as a fulcrum; wherein a pushing-up device is provided on a side for supporting said elevator such that said pushing-up device pushes up the rear edge of the wheel supporting plate by a relative descending movement of the elevator so that the wheel supporting plate takes the tilted posture when the elevator arrives at the lowermost position, and the posture switching means is constituted of said pushing-up; wherein rollers, which functions as a fulcrum, are supported at the front edge of the wheel supporting plate, so that the rollers can roll back and forth in terms of the convey direction on a supporting face provided on said side for supporting said elevator; and wherein said lifting means is constituted of a pusher that pushes up the front edge of the wheel supporting plate and an actuator that drives the pusher to move up and down with respect to the elevator.

* * * * *